United States Patent [19]
Roodvoets

[11] 3,899,406
[45] Aug. 12, 1975

[54] ANTIOXIDANTS FOR ULTRAVIOLET CURABLE HIGH VINYL POLYBUTADIENES
[75] Inventor: Mark R. Roodvoets, Akron, Ohio
[73] Assignee: The Firestone Tire and Rubber Company, Akron, Ohio
[22] Filed: Apr. 26, 1974
[21] Appl. No.: 464,591

[52] U.S. Cl..... 204/159.2; 260/45.95 H; 260/45.95 R; 260/45.9 QB
[51] Int. Cl.$^2$ ................ C08C 19/00; C08J 3/28
[58] Field of Search .......... 204/159.2; 260/45.9 QB, 260/45.95 R, 45.95 H

[56] References Cited
UNITED STATES PATENTS

| | | | |
|---|---|---|---|
| 2,970,128 | 1/1961 | Csendes | 260/45.95 H |
| 3,245,894 | 4/1966 | Hinton | 204/159.2 |
| 3,288,749 | 11/1966 | Cox | 260/45.95 R |
| 3,355,419 | 11/1967 | Cook | 260/45.95 H |
| 3,391,107 | 7/1968 | Stahly | 260/45.95 R |
| 3,686,158 | 8/1972 | Bouton | 260/94.2 M |

OTHER PUBLICATIONS

Industrial and Engineering Chemistry, October 1955, pp. 2091 to 2095.
Light Sensitive Systems by Kosar, Wiley & Sons, 1965, pp. 158–164.

Primary Examiner—V. P. Hoke

[57] ABSTRACT

An ultraviolet curable resin contains antioxidant compounds selected from the class consisting of 2,2 methylene bis (4-$R_1$, 6-$R_2$-phenol) wherein $R_1$ is an aliphatic group having from 1 to 4 carbon atoms and $R_2$ is an aliphatic group having 3 or 4 carbon atoms, and at least one material selected from the class consisting of the dibutyl paracresols and from the N,N'-di(1-$R_3$,1-$R_4$-methyl) p-phenylene diamine where $R_3$ is an aliphatic group having from 1 to 4 carbon atoms and $R_4$ is an aliphatic group having from 4 to 6 carbon atoms.

23 Claims, No Drawings

ANTIOXIDANTS FOR ULTRAVIOLET CURABLE HIGH VINYL POLYBUTADIENES

BACKGROUND OF THE INVENTION

The present invention relates to antioxidant compounds for polymers curable by ultraviolet light. More specifically, the present invention relates to the use of antioxidants which increase the shelf life of ultraviolet curable high vinyl polybutadiene and have little effect on or actually increase the cure rate of the polybutadiene.

Heretofore, antioxidants have predominantly been used with various polymers to prevent, of course, oxidation and gel retardation. For example, various antioxidants have been used to enhance the resistance of high vinyl polybutadienes to thermo-oxidative deterioration. However, the use of specific antioxidants for gel retardation of high vinyl polybutadiene which are ultraviolet curable are relatively unknown. Although various specific antioxidants may be used for such ultraviolet curing, such compounds have very little effect upon retarding gellation and have very little, if any, effect on increased stability or shelf-life. Thus, ultraviolet curable polymers such as high vinyl polybutadiene heretofore had to be cured in a relatively short time after preparation. Not only was such a process impractical, but resulted in increased costs as well.

SUMMARY OF THE INVENTION

Accordingly, it is an object of the present invention to produce ultraviolet curable resins which have greatly improved stability and shelf-life.

It is another object of the present invention to produce ultraviolet curable high vinyl polybutadiene resins which have greatly improved gel retardation properties.

It is a further object of the present invention to produce ultraviolet curable resins, as above, through the use of various specific combinations of particular type antioxidants.

It is still another object of the present invention to produce ultraviolet curable resins, as above, wherein the various axtioxidant combinations have little effect on or actually increase the cure rate.

It is a still further object of the present invention to produce ultraviolet curable resins, as above, which are conveniently processed, can be stored for long periods of time and then conveniently and economically cured.

These and other objects of the present invention, together with the advantages thereof over existing prior art compounds and methods which will become apparent from the following specification are accomplished by the methods and compounds hereinafter described and claimed.

In general, antioxidized compositions curable by ultraviolet light comprise, by weight, 100 parts of an ultraviolet curable resin, from 0.02 to about 0.4 of an antioxidant material selected from the class consisting of 2,2 methylene bis (4-$R_1$, 6-$R_2$-phenol) where $R_1$ is an aliphatic group having from 1 to 4 carbon atoms and $R_2$ is an aliphatic having 3 to 4 carbon atoms and at least one material selected from the class consisting of from 0.01 to about 0.5 of a dibutyl paracresol and from 0.005 to about 0.1 of N,N'-di(1-$R_3$,1-$R_4$-methyl) p-phenylene diamine where $R_3$ is an aliphatic group having from 1 to 4 carbon atoms and $R_4$ is an aliphatic group having 4 to 6 carbon atoms.

DESCRIPTION OF THE PREFERRED EMBODIMENTS

According to the concepts of the present invention, ultraviolet curable resins are produced which possess good gel retardation, stability, and shelf-life without adverse effect on curing rates, through the use of various combinations of particular types of antioxidants. The various combinations of antioxidants can be added generally during the polymerization of the polymers, or at any suitable later point in time such as during compounding. Generally, it is desirable to add the combination of antioxidants immediately after polymerization or at any time thereafter including up to compounding or the like to retard and prevent premature cure of the polymers such as from light, heat or partial premature cure caused by the initiator.

The polymer or resin generally can be any polymer which can be ultravioletly cured with or without the use of ultraviolet initiators. Specifically, a preferred class of polymers are those based on polymers of butadiene or copolymers of butadiene in an amount of about 40% to about 95% by weight per 100 parts of resin. Additionally, up to 60% by weight of the copolymer may be styrene. Moreover, portions from about 5% up to about 60% per 100 parts of resin of other ethylenically unsaturated compounds or vinyl type co-reactive monomers may be incorporated into the polymer or copolymers. These polybutadiene resins may be prepared by means of free radical or anionic catalyst at conventional temperature according to conventional methods to a relatively low molecular weight of about 1,000 to 200,000 and more desirably from about 10,000 to 100,000 so that they are of at least a flowable consistency. These low molecular weight family of polybutadiene polymers or resins can then be incorporated with any desirable and/or conventional compounds or additives such as fillers, for example carbon, silica, glass fiber, glass fabric, asbestos and the like; pigments; flame retardants; and so forth. The amount of such additives of course may vary over broad ranges as readily apparent and known to those skilled in the art. Generally, methacrylates are avoided since they hinder cure rates in the present invention.

Desirably, the polybutadiene family of resins have a high vinyl content of at least 50% and preferably of at least 80% and more preferably, at least 90%. That is, the butadiene units are incorporated into the polymeric chain largely in the 1,2-configuration.

An initiator or catalyst is generally required in the ultraviolet curing of polymers such as the high vinyl polybutadiene compounds. Generally, any ultraviolet initiator which is decomposed by ultraviolet light may be utilized in the present invention. A specific initiator are the benzoin (benzoylphenylcarbinol) ethers such as benzoin ethyl ether, benzoin methyl ether, benzoin propyl ether and benzoin butyl ether. Depending upon the rate of desirable cure, a lesser or greater amount of such a catalyst can be used. A desirable range of the benzoin ethers is from about 0.2 to about 5.0 parts by weight per 100 parts of curable resin with the low portion of the range, that is, from about 0.2 to about 3.0 being preferred.

The composition containing the curable polymer resins, initiators, various combinations of antioxidants and various additives, if any, are prepared for their intended end purpose or use and cured by the application of ultraviolet light. Generally, depending upon the intensity of the ultraviolet light, the composition can be cured at generally ambient or elevated temperatures (10°–100°C) from a matter of minutes, preferably even seconds as in production, and sometimes in a matter of a few hours or more as where the intensity is very low. Desirably, a short cure time is preferred especially in continuous processes or rapid batch operations. The amount and intensity of ultraviolet light can be readily and quickly determined for various applications.

Preferably, as above noted, the curable resin contains a co-reactive vinyl monomer which serves as a solvent to obtain a desirable viscosity for use such as molding as well as an additional monomer to chain extend the polymers. Specific vinyl monomer examples for use with the above noted family of high vinyl polybutadiene resins include vinyl toluene, divinyl benzene. Any other conventional vinyl monomers which react with high vinyl rubber resins can also be used. A favorable range has been found to extend from about 20% to about 50% by weight with the remaining percent being the ultraviolet curable polymer. A favorable amount which has been found to give good results is roughly 30%.

Conventional crosslinking agents from 0% to about 10% by weight of the resin may also be used if desired. Generally, a very high molecular weight composition is obtained upon curing so that crosslinking agents are not required.

The above ultraviolet curable compositions may be used for forming films, coatings and even molded articles. Of course, the thickness of the desired article is limited by the practical consideration of the penetrating depth of the ultraviolet light. Examples of specific uses of ultraviolet curable polymer resins according to the present invention include the coating of various metal cans and containers to moisture proof them for storing food and beverages and for making films or liners to store items or to moisture proof packages.

The various combinations of antioxidant compounds according to the present invention have been found to greatly increase shelf-life and stability of ultraviolet curable resins or stocks such as from 2 to 12 hours without any antioxidant to about 2 weeks to a few months. This result is in contrast to most antioxidant compounds which slow the cure rate and shorter shelf-life. The desirable results of the present invention is accomplished primarily through the prevention of crosslinking or formation of gel sites through coupling and has been found to have very little, if any, effect on or actually increased the cure rate. The first class of antioxidants for use with combination of other antioxidants is 2,2 methylene bis (4-$R_1$, 6-$R_2$-phenol), wherein $R_1$ is an aliphatic group containing from 1 to 4 carbon atoms and $R_2$ is also an aliphatic group containing 3 or 4 carbon atoms. Specifically, the class of compounds wherein $R_1$ is ethyl or methyl and $R_2$ is a t-butyl or isopropyl are preferred. The amount of this particular class of antioxidant generally ranges from 0.02 to about 0.4 parts by weight per 100 parts of curable polymer and coupling agent (polymer mixture) with a preferred range being from about 0.05 to about 0.15 parts. A highly preferred or optimum amount is approximately 0.1 part. Generally, amounts of this antioxidant in excess of 0.4 parts can be utilized but tend to reduce the cure rate as well as be uneconomical.

The 2,2 methylene bis (4-$R_1$, 6-$R_2$-phenol) class of antioxidant is utilized in the present invention in combination with a second antioxidant class of compounds, namely the dibutyl paracresols. In general, any of the various dibutyl isomers of paracresol may be utilized in amounts of 0.01 to about 0.5 with a preferred amount being from about 0.025 to about 0.075 with a highly preferred or optimum amount of about 0.05 parts by weight. As with the above antioxidant, amounts of dibutyl paracresol in excess of the maximum amount of 0.25 parts by weight may be utilized but generally are undesirable since it adversely affects the cure rate and is also uneconomical. Additionally, should only two compounds be used in the combination, the amount of compound from each class will generally be higher than if three compounds were used.

In general, the ratio of the 2,2 methylene bis (4-$R_1$, 6-$R_2$-phenol) class of antioxidant to the dibutyl paracresol class of antioxidant is generally about 4 parts to 2 parts by weight with any class being varied generally 100% or less. Thus, instead of a ratio of 4 to 2, the amounts of compounds may exist by weight in the combination of 4 to 4, or 4 to 1. Moreover, it has been found that the combination of these two classes of antioxidants produces unexpectedly improved or synergistic results the reasons of which are not clearly understood. Such synergism produces the above-noted greatly improved and extended shelf-life and stability of the preferred family of high vinyl polybutadiene polymer resins.

Another class of antioxidant compounds are the N,N'-di(1-$R_3$, 1-$R_4$-methyl) p-phenylene diamines wherein $R_3$ is an aliphatic group having from 1 to 4 carbon atoms and $R_4$ is an aliphatic group having 4 to 6 carbon atoms. Specifically, the class of compounds wherein $R_3$ is methyl or ethyl and $R_4$ is isobutyl. The amount of this antioxidant can generally range from 0.005 to about 0.1, preferably from about 0.01 to about 0.04 and a highly preferable or optimum amount of about 0.025 parts by weight. Amounts in excess of 0.1 parts by weight can be used or generally makes the polymer dark or black. As with the dibutyl paracresols, the third class of antioxidants can be used in combination with the 2,2 methylene bis (4-$R_1$, 6-$R_2$-phenol) class of antioxidants and preferably in a ratio by weight of 4 to 1 with any of the compounds generally varying by 100 % or less. Thus, instead of a ratio of 4 to 1, the ratio of this particular combination of compounds may be 4 to 2 or 4 to ½. The third class in combination with the first class of antioxidants also produces a synergistic result very similar to the use of the dibutyl paracresols. Moreover, this particular combination has been found to give the fastest curing rates.

In addition to the combination of the first class of antioxidants, namely 2,2 methylene bis (4-$R_1$, 6-$R_2$-phenol) with the dibutyl paracresols or N,N'-di(1-$R_3$, 1-$R_4$-methyl)p-phenylene diamines, all three of these compounds can be used in combination. In fact, the use of all three classes of antioxidants has been found to produce the best overall results and therefore is preferred in the present invention.

In the preparation of antioxidized compositions curable by ultraviolet light according to the present invention, the process is very versatile with the combined antioxidants, initiators, coupling agents and additives being added either together as by compounding, milling, or the like or at separate steps or combinations thereof. Preferably, the combination of antioxidants are added before or co-currently with the addition of the initiator. Thus, few or many process steps in various orders may exist. During the preparation of the composition of the present invention, a portion of the various antioxidant compounds may be lost, particularly the liquid compounds, as through evaporation during compounding, milling or the like. At times, such loss can be up to about 25% and even 50% of the total weight of the compound. Hence, conditions can be varied to prevent such loss or the actual amount of particular antioxidant increase so that the final amount will generally be the desired amount. Upon ultraviolet cure or crosslinking, the resin is so extended that exceedingly high molecular weight compositions exist.

The improved result of the present invention will be more apparent and more fully understood by the following examples.

Various high vinyl polybutadiene ultraviolet curable compositions containing various antioxidants and combinations thereof were prepared in accordance with the formulations set forth in Table I.

As apparent from Table II, compounds A, C and G produce cloudy or very cloudy solutions after seven days which are indicative of highly localized gel portions. However, the synergistic result of the combined combinations of the present invention are clearly shown in the bottom portion of Table II wherein shelf-life stabilities of ultraviolet curable stocks resulted. Stocks having the combination of 2,2 methylene bis (4-$R_1$, 6-$R_2$-phenol) with dibutyl paracresol as the antioxidants had the longest shelf life.

A Hanovia 125 watt low pressure mercury vapor lamp was used as the ultraviolet source to cure the approximate 1 millimeter coating of the aluminum foil samples at intervals while they were aging. The standard cure interval was 6 minutes at 4 inches. Benzoin ethyl ether at a level of 4 parts was used as the ultraviolet initiator. Cure rate was determined from the degree of cure after 6 minutes. The degree of cure was determined by rubbing the coating with a toluene soaked rag and observing the number of strokes at which the coat-

TABLE I

FORMULATION OF ANTIOXIDIZED HIGH VINYL POLYBUTADIENE U.V. CURABLE COMPOSITIONS
(Parts by Weight)

| COMPOUND | A | C | G | A/C/G | A/G | A/C | C/G/H | Control |
|---|---|---|---|---|---|---|---|---|
| 90%+ Vinyl Polybutadiene Homopolymer | 70 | 70 | 70 | 70 | 70 | 70 | 70 | 70 |
| Divinyl Benzene | 30 | 30 | 30 | — | — | — | — | 30 |
| Vinyl Toluene | — | — | — | 30 | 30 | 30 | 30 | — |
| Benzoin Ethyl Ether | 4.0 | 4.0 | 4.0 | 4.0 | 4.0 | 4.0 | 4.0 | 4.0 |
| 2,2 methylene bis (4-ethyl,6-t-butyl phenol) | .15 | — | — | .10 | .10 | .10 | — | — |
| Dibutyl paracresol | — | .15 | — | .05 | — | .05 | .05 | — |
| N,N'-di(1-ethyl-3-methyl-pentyl) p-phenylene diamine | — | — | .025 | .025 | .025 | — | .025 | — |
| 2,2 methylene bis (4-methyl, 6-t-butyl phenol) | — | — | — | — | — | — | .10 | — |

The samples were mixed in bulk using an air stirrer. The polybutadiene was diluted with the coupling agent monomer to reduce the viscosity so that the wound wire rod technique could be used to coat aluminum foil. After coating, the high vinyl polybutadiene stocks were left in closed jars away from direct sunlight and were observed periodically for gellation. The gellation results are set forth in Table II wherein the degree of change in color represents a correlation to the amount of gel or coupling.

TABLE II

SHELF-LIFE STABILITY OF U.V. CURABLE STOCKS

| COMPOUND | COLORATION AFTER 3 DAYS | COLORATION AFTER 7 DAYS |
|---|---|---|
| A | Slight darkening at the top | Very cloudy |
| C | Slight darkening at the top | Very very cloudy |
| G | Slight darkening at the top | Very cloudy |
| A/C/G | Darker (slightly) | Cloudy |
| A/G | Darker (slightly) | Cloudy |
| A/C | No Change | No Change |
| C/G/H | Darker | Cloudy |
| Control | Gelled | Gelled | ing began to dissolve. A higher degree of cure or faster cure rate corresponds to a higher test value. The results are set forth in Table III.

TABLE III

ULTRAVIOLET CURES OF ANTIOXIDANT STOCKS
Numbers give degree of cure after 6 minutes
at 4 inches (40 = completely cured, 0–5 = completely uncured)

| COMPOUND | UN-AGED | 3 DAYS | 6 OR 7 DAYS |
|---|---|---|---|
| A | 4 | 3 | 33 |
| C | 10 | 7 | 32 |
| G | 8 | 10 | 19 |
| A/C/G | 28 | 34 | 35 |
| A/G | 27 | 29 | 40+ |
| A/C | 20 | 23 | 36 |
| C/G/H | 18 | 21 | 40 |
| Control | 20 | Gelled | Gelled |

As apparent from Table III, generally the combinations of the present invention gave higher cure rates than any of the antioxidants individually. The combination containing all three classes of antioxidant according to the best present invention gave the best overall properties (increased time to gellation and cure rate). Additionally, many other antioxidants and combinations were investigated and not found to approach the results of the present invention.

Additionally, combinations of antioxidant compounds A, C, and G were prepared and tested in a manner set forth above with the exception that the amount of antioxidant A was doubled, the amount of antioxidant C was increased to 0.15 and also to 0.25. The results obtained after a cure of six minutes at 4 inches are set forth in Table IV.

TABLE IV

|  | A/C/G AMT. OF A DOUBLED | A/C/G AMT. OF C INCREASED TO .15 | A/C/G AMT. OF C INCREASED TO .25 | TIME PERIOD |
| --- | --- | --- | --- | --- |
| Coloration | clear | clear | clear | 0 days |
| Cure | cure: 14 | cure: 17 | cure: 18 | |
| Coloration | clear | clear | clear | 2 days standard darkened |
| Cure | | | | |
| Coloration | clear | clear | clear | 5 days standard gelled |
| Cure | | | | |
| Coloration | clear | clear | clear | 8 days |
| Cure | cure: 15 | cure: 21 | cure: 23 | |
| Coloration | clear | clear | clear | 1 month accelerated aging |
| Cure | cure: 15 | cure: 19 | cure: 9 | |

As apparent from Table IV, when the amount of antioxidant A (first class of antioxidant) was doubled, although the coloration remained clear, the amount or extent of curing was medium. Considering the cases wherein antioxidant C (dibutyl paracresol) was increased, the coloration also was generally clear and the cure was only moderate. Thus, these results indicate that compositions containing amounts of antioxidants at their upper range tended to slightly lessen their synergistic effect.

As another example of the synergistic effect of the combinations of antioxidants, five high vinyl rubber stocks were prepared utilizing the formulation set forth above in Table I using only antioxidant C (0.05 parts) and antioxidant G (0.025 parts). The shelf-lives of these stocks were only one day. However, when identical formulations were prepared except that they contained 0.1 part of antioxidant A, the shelf-lives were increased to 14 days.

While the present invention has been explained in detail with respect to the preferred embodiments, in accordance with the Patent Statutes, as apparent to one skilled in the art, various modifications can be made according to the concepts of the present invention without departing from the spirit and scope of the invention herein disclosed; the scope of the invention being measured solely by the scope of the attached claims.

What is claimed is:

1. A process of producing antioxidized ultraviolet cured compositions comprising the steps of: adding by weight 100 parts of an ultraviolet curable resin; said resin containing about 40 parts to about 95 parts of a butadiene polymer or copolymer thereof with co-reactive monomers, said co-reactive monomers being vinyl monomers and ranging from about 5 parts to about 60 parts, said polybutadiene polymer being a homopolymer of butadiene or a copolymer of butadiene and styrene and containing at least 40% by weight of butadiene and at least 80% of the butadiene repeating units in the polymer or copolymer being in the 1,2-configuration, adding from 0.02 to about 0.4 parts of an antioxidant of a 2,2 methylene bis (4-$R_1$, 6-$R_2$-phenol) wherein $R_1$ is an aliphatic group having from 1 to 4 carbon atoms and $R_2$ is an aliphatic group having 3 or 4 carbon atoms, adding an antioxidant selected from the class consisting of (I) from 0.01 to about 0.5 parts of a dibutyl paracresol, and (II) from 0.005 to about 0.1 part of a N,N'-di(1-$R_3$, 1-$R_4$-methyl) p-phenylene diamine where $R_3$ is an aliphatic group having 1 to 4 carbon atoms and $R_4$ is an aliphatic group having 4 to 6 carbon atoms and III mixtures of (I) and (II), and then curing said curable resin having an improved cure rate with an ultraviolet source.

2. A process of producing antioxidized ultraviolet curable compositions according to claim 1, including the additional step of adding an ultraviolet initiator.

3. A process of producing antioxidized ultraviolet curable compositions according to claim 2, wherein from about 0.2 to about 5.0 parts of said initiator is selected from the class consisting of benzoin ethers.

4. A process of producing antioxidized ultraviolet curable compositions according to claim 1, wherein said 2,2 methylene bis (4-$R_1$, 6-$R_2$-phenol) antioxidant exists in the amount of about 0.05 to about 0.15.

5. A process of producing antioxidized ultraviolet curable compositions according to claim 1, wherein said dibutyl paracresol antioxidant exists in the amount of about 0.025 to about 0.075.

6. A process of producing antioxidized ultraviolet curable compositions according to claim 1, wherein said N,N'-di(1-$R_3$, 1-$R_4$-methyl) p-phenylene diamine class of antioxidant exists in an amount of from about 0.01 to about 0.04.

7. A process of producing antioxidized ultraviolet curable compositions according to claim 1, wherein said 2,2 methylene bis (4-$R_1$, 6-$R_2$-phenol) antioxidant exists in the amount of about 0.05 to about 0.15, said dibutyl paracresol antioxidant exists in the amount of about 0.025 to about 0.075 and said N,N'-di(1-$R_3$, 1-$R_4$-methyl) p-phenylene diamine class of antioxidant exists in an amount of from about 0.01 to about 0.04.

8. A process of producing antioxidized ultraviolet curable compositions according to claim 1, wherein $R_1$ is methyl or ethyl, $R_2$ is isopropyl or t-butyl.

9. An antioxidized ultraviolet cured composition, said composition comprising by weight: 100 parts of an ultraviolet cured resin: said cured resin containing about 40 parts to about 95 parts of a butadiene resin or copolymer thereof with co-reactive monomers, said co-reactive monomers being vinyl monomers and ranging from about 5 parts to about 60 parts, said polybutadiene polymer being a homopolymer of butadiene or a copolymer of butadiene and styrene and containing at least 40% by weight of butadiene and at least 80% of the butadiene repeating units in the polymer or copolymer being in the 1,2 configuration, from 0.02 to about 0.4 parts of an antioxidant of a 2,2 methylene bis (4-$R_1$, 6-$R_2$-phenol) wherein $R_1$ is an aliphatic group having from 1 to 4 carbon atoms and $R_2$ is an aliphatic group having 3 or 4 carbon atoms; and from 0.01 to about 0.5 parts of a dibutyl paracresol.

10. An antioxidized ultraviolet cured composition according to claim 9, containing an ultraviolet initiator.

11. An antioxidized ultraviolet cured composition according to claim 10, wherein from about 0.2 to about 5.0 parts of said initiator is selected from the class consisting of benzoin ethers.

12. An antioxidized ultraviolet cured composition according to claim 9, wherein said 2,2 methylene bis (4-$R_1$, 6-$R_2$-phenol) antioxidant exists in the amount of from about 0.05 to about 0.15.

13. An antioxidized ultraviolet cured composition according to claim 9, wherein said dibutyl paracresol antioxidant exists in the amount of from about 0.025 to about 0.075.

14. An antioxidized ultraviolet cured composition according to claim 9, wherein said 2,2 methylene bis (4-$R_1$, 6-$R_2$-phenol) antioxidant exists in the amount of from about 0.05 to about 0.15, and dibutyl paracresol antioxidant exists in an amount of from about 0.025 to about 0.075.

15. An antioxidized ultraviolet cured composition according to claim 9, wherein $R_1$ is methyl or ethyl, and $R_2$ is isopropyl or t-butyl.

16. An ultraviolet cured antioxidized composition comprising, by weight: 100 parts of an ultraviolet curable resin mixture; said resin containing about 40 parts to about 95 parts of a butadiene polymer or copolymer thereof with co-reactive monomers, said co-reactive monomers being vinylmonomers and ranging from about 5 parts to about 60 parts, said polybutadiene polymer being a homopolymer of butadiene or a copolymer of butadiene and styrene and containing at least 40% by weight of butadiene and at least 80% of the butadiene repeating units in the polymer or copolymer being in the 1,2 configuration; from 0.02 to about 0.4 parts of an antioxidant of a 2,2 methylene bis (4-$R_1$, 6-$R_2$-phenol) wherein $R_1$ is an aliphatic group having from 1 to 4 carbon atoms and $R_2$ is an aliphatic group having 3 or 4 carbon atoms; and an antioxidant selected from the class consisting of (I) from 0.005 to about 0.1 parts of a N,N'-di(1-$R_3$, 1-$R_4$-methyl) p-phenylene diamine where $R_3$ is an aliphatic group having from 1 to 4 carbon atoms and $R_4$ is an aliphatic group having from 4 to 6 carbon atoms, (II) from 0.01 to about 0.5 parts of a dibutyl paracresol and III mixtures of (I) and (II) so that said cured composition has an improved ultraviolet cure rate.

17. An ultraviolet curable antioxidized composition according to claim 16, including an ultraviolet initiator.

18. An ultraviolet curable antioxidized composition according to claim 17, wherein from about 0.2 to about 5.0 parts of said initiator is selected from the class of benzoin ethers.

19. An ultraviolet curable antioxidized composition according to claim 16, wherein said antioxidant of 2,2 methylene bis (4-$R_1$, 6-$R_2$-phenol) exists in an amount of about 0.05 to about 0.15.

20. An ultraviolet curable antioxidized composition as in claim 16, wherein the antioxidant is selected from the class of dibutyl paracresols exists in the amount of from about 0.025 to about 0.075.

21. An ultraviolet curable antioxidized composition according to claim 16, wherein the antioxidant is selected from the class consisting of N,N'-di(1-$R_3$, 1-$R_4$-methyl) p-phenylene diamine exists in an amount from about 0.01 to about 0.04.

22. An ultraviolet curable antioxidized composition according to claim 16, wherein said 2,2 methylene bis (4-$R_1$, 6-$R_2$-phenol) antioxidant exists in the amount of about 0.05 to about 0.15, said dibutyl paracresol antioxidant exists in the amount of about 0.025 to about 0.075 and said N,N'-di(1-$R_3$, 1-$R_4$-methyl) p-phenylene diamine class of antioxidant exists in an amount of from about 0.01 to about 0.04.

23. An ultraviolet curable antioxidized composition according to claim 16, wherein $R_1$ is methyl or ethyl, and $R_2$ is isopropyl or t-butyl.

* * * * *